J. W. PLATT & H. F. RODEMEYER.
TRANSPORT TRUCK FOR DISK HARROWS.
APPLICATION FILED OCT. 12, 1908.
1,003,648.
Patented Sept. 19, 1911.
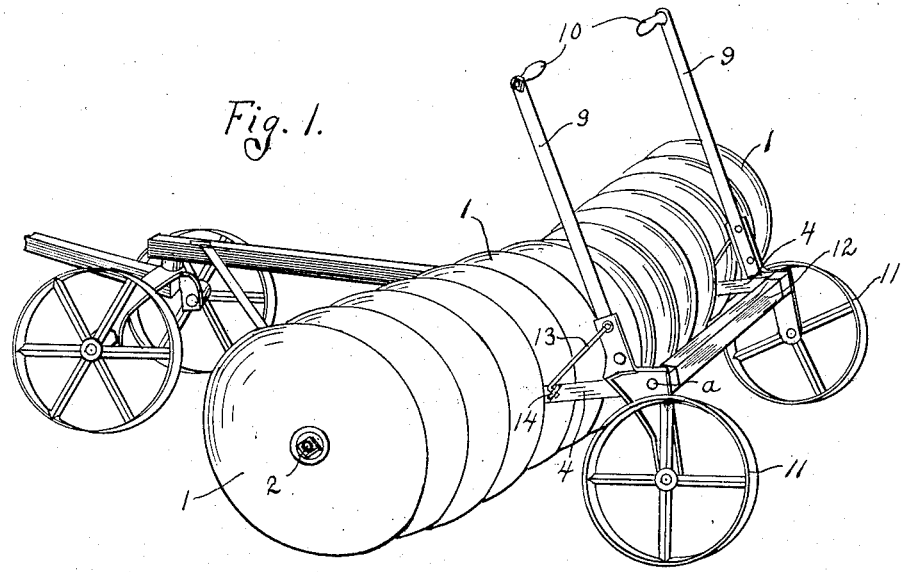
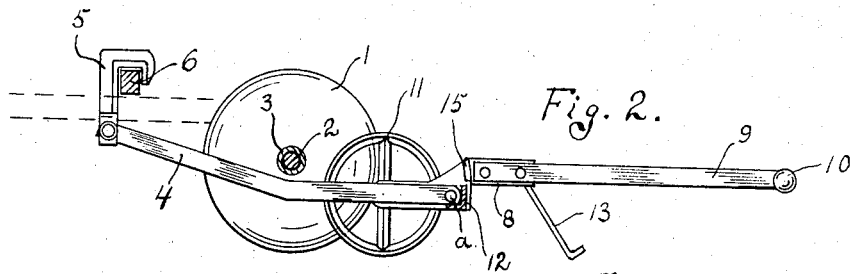
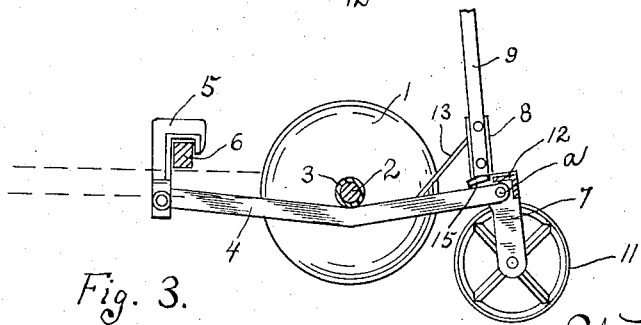

UNITED STATES PATENT OFFICE.

JOHN W. PLATT AND HENRY F. RODEMEYER, OF STERLING, ILLINOIS, ASSIGNORS, BY DIRECT AND MESNE ASSIGNMENTS, OF ONE-HALF TO STERLING MANUFACTURING COMPANY, OF STERLING, ILLINOIS, AND ONE-HALF TO THE JANESVILLE MACHINE COMPANY, OF JANESVILLE, WISCONSIN, A CORPORATION.

TRANSPORT-TRUCK FOR DISK HARROWS.

1,003,648.  Specification of Letters Patent. Patented Sept. 19, 1911.

Application filed October 12, 1908. Serial No. 457,285.

*To all whom it may concern:*

Be it known that we, JOHN W. PLATT and HENRY F. RODEMEYER, citizens of the United States, residing at Sterling, in the county of Whiteside and State of Illinois, have invented certain new and useful Improvements in Transport-Trucks for Disk Harrows, of which the following is a specification.

Our invention has reference to trucks for disk harrows, and is designed to be employed in transporting the harrow from one place to another, when not in operation, and not only furnish a more convenient means of transportation than that afforded by the disks themselves, but also protect the cutting edges of such disks from unnecessary wear upon the hard surface of a road or highway.

Our device is simple and durable in construction, and by the use thereof both of the gangs of a disk cultivator can be elevated from the earth at the same time, for the purpose of transportation, and similarly lowered again to an operative position.

The device is also capable of being readily attached to the harrow, or detached therefrom, when not in use.

In the drawings: Figure 1 is a perspective showing the disks of a cultivator, and our device attached thereto, in position for transporting the machine. Fig. 2 is a section, showing the inner face of one of the supporting members, in position, but with the disks unsupported thereby. Fig. 3 is a similar view, with the disks supported, in position for transportation.

Similar numbers refer to similar parts throughout the several figures.

1 1 represent the usual disks of a disk cultivator, 2 the shaft of one of the gangs thereof, and 3 one of the spools separating two adjacent disks. Extending transversely of the disk shafts, and immediately below the same, is a pair of supporting bars 4 4, each provided at its forward end with a hook 5, adapted to engage a cross-bar 6 supported in the frame of the cultivator. At their rear ends the bars 4 are pivoted to plates 7, as at *a*, and to projections 8 of the plates 7 are secured levers 9, provided at their outer ends with handles 10. The free ends of the plates are provided with wheels 11, and said plates are rigidly united by means of an angle-plate 12. The bars 4 are bent substantially midway of their lengths to provide opposite inclined portions and a central seat or depression.

To use the truck the bars 4 are inserted beneath the disk shafts from the rear, and the bar 6 engaged by the hooks 5, in the position shown in Fig. 2. The handles 10 are then grasped by the operator, and the levers 9 simultaneously raised, rocking the plates 7 upon their pivotal points, and moving the wheels 11 rearwardly. This operates to raise the rear ends of the bars 4 until they engage the spools on the disk shafts, and elevate such shafts until the disks are out of contact with the earth, as shown in Figs. 1 and 3. The two angularly disposed portions of each bar 4 will cause the harrow shaft to gravitate to said central seat or depression. By reversing the above operation the disks are again lowered and the truck disengaged from the machine.

The levers 9 may be held in raised position by means of hooks 13, pivotally secured to the projections 8, and adapted to engage eyes 14 on the bars 4. By means of shoulders 15 on the inner faces of the plates 7, which are adapted to come in contact with the upper edges of the bars 4, the forward movement of the levers 9 is limited.

By removing the cross-plate 12, either of the bars 4 can be actuated independently of the other, by means of the lever mechanism connected therewith, to raise the disk-gangs with which they are connected. It is preferred, however, to have the parts united, as hereinbefore described, as by so doing a solid truck is produced, and the disks more rigidly supported thereby. When united, a proper spacing of the wheels 11 will cause such wheels to follow in the usual tracks of a highway.

It will also be apparent that each of the levers 9 with the accompanying plate 7, comprises a substantially continuous lever, of which the lever 9 constitutes the long arm and the plate 7 the short arm. The lever thus has a double fulcrum, one of which is movable away from the disks, when the same are being raised, whereby the operation of raising the load upon the truck is greatly facilitated.

What we claim as our invention, and desire to secure by Letters Patent of the United States, is:

1. A transportation truck for disk harrows comprising a supporting bar adapted to extend beneath and engage the disk gang, a lever bar for raising and lowering said supporting bar pivoted intermediate its ends to the rear end of said supporting bar, and a wheel journaled on the lower end to said lever bar, said supporting bar having means for detachably securing its forward end to the harrow frame.

2. A transportation truck for disk harrows comprising a supporting bar adapted to extend beneath and engage the disk gang, a lever bar pivoted intermediate its ends and adjacent its lower end to the rear end of said supporting bar, a wheel journaled on the lower end of said lever bar, and a hook pivoted at the forward end of said supporting bar and arranged to detachably engage the harrow frame.

3. The combination with a harrow frame and disk gangs connected thereto, supporting bars extending beneath and engaging the disk gangs, lever bars pivoted intermediate their ends to the rear ends of said supporting bars and having wheels journaled on their lower ends, the lower ends of said lever bars being arranged to swing on opposite sides of a vertical position as said gangs are raised and lowered, and means for limiting the movement of said lever bars and for holding the parts in position with the lower ends thereof downwardly and rearwardly inclined from the pivot connections between said lever bars and said supporting bars.

4. A removable truck for disk harrows, comprising parallel bars, hook members pivoted on the forward ends of both bars for attachment to the frame of the harrow, levers pivoted to the rear ends of said bars, wheels on the ends of said levers, and means for locking said levers in operative position, said bars being bent between their ends to provide a seat and opposite inclined portions, the latter serving to cause the harrow shaft to gravitate to said seat when elevated.

In testimony whereof we affix our signatures in presence of two witnesses.

JOHN W. PLATT.
HENRY F. RODEMEYER.

Witnesses:
 WALTER N. HASKELL,
 J. Q. WEAVER.